United States Patent
Emerson

(10) Patent No.: US 6,583,946 B1
(45) Date of Patent: Jun. 24, 2003

(54) METHOD OF PROVIDING READ BIAS DURING SERVO BLOCK WRITE

(75) Inventor: Paul M. Emerson, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 408 days.

(21) Appl. No.: 09/612,456

(22) Filed: Jul. 7, 2000

Related U.S. Application Data

(60) Provisional application No. 60/141,957, filed on Jul. 1, 1999.

(51) Int. Cl.[7] .............................. G11B 5/03; G11B 5/02; G11B 21/02
(52) U.S. Cl. .................................. 360/66; 36/67; 36/75
(58) Field of Search .............................. 360/46, 66, 67, 360/75

(56) References Cited

U.S. PATENT DOCUMENTS

| | | | |
|---|---|---|---|
| 5,208,556 A | 5/1993 | Wilson | 331/1 |
| 5,373,402 A | 12/1994 | Price, Jr. et al. | 360/61 |
| 5,444,583 A | 8/1995 | Ehrlich et al. | 360/78 |
| 5,448,433 A | 9/1995 | Morehouse et al. | 360/97 |
| 5,535,067 A | 7/1996 | Rooke | 360/51 |
| 5,570,241 A | 10/1996 | Nielson et al. | 360/46 |
| 5,642,244 A | 6/1997 | Okada et al. | 360/61 |
| 5,719,719 A | 2/1998 | Tsuyoshi et al. | 360/66 |
| 5,793,559 A | 8/1998 | Shepherd et al. | 360/78 |
| 5,831,888 A | 11/1998 | Glover | 364/807 |
| 5,862,005 A | 1/1999 | Leis et al. | 360/27 |
| 5,959,798 A * | 9/1999 | Sasaki et al. | 360/67 |
| 6,342,986 B2 * | 1/2002 | Nguyen | 360/75 |
| 6,366,420 B1 * | 4/2002 | Ranmuthu et al. | 360/66 |
| 6,404,579 B1 * | 6/2002 | Ranmuthu et al. | 360/66 |

* cited by examiner

*Primary Examiner*—Regina N. Holder
(74) *Attorney, Agent, or Firm*—April M. Mosby; Wade James Brady, III; Frederick J. Telecky, Jr.

(57) ABSTRACT

The manufacturer of hard disk drives (HDD) simultaneously activates all write heads to format the magnetoresistive disks during an operation known in the industry as "servo bank write". To reduce bit error rates resulting from coupling between the write heads and the read heads during the servo bank write operation, the invention herein provides a relatively small amount of bias current to each read head when all the write heads are activated. The small bias current raises the dc bias level on the reader portion of the magnetoresistive head and effectively eliminates negative spikes resulting from the coupling.

5 Claims, 2 Drawing Sheets

METHOD OF PROVIDING READ BIAS DURING SERVO BLOCK WRITE

This application claims priority under 35 USC §119(e)(1) of provisional application No. 60/141,957 filed Jul. 1, 1999.

FIELD OF THE INVENTION

The invention relates generally to the field of information storage and more particularly relates to hard disk drives.

BACKGROUND OF THE INVENTION

U.S. Pat. No. 5,831,888 entitled "Automatic Gain Control Circuit" and assigned to Texas Instruments Incorporated, the assignee of the present invention, sets forth generally the description of disk storage for information. Hard disk drives (HDD) are one type of disk storage that is particularly used in personal computers today. The HDD device generally includes a magnetic storage media, such as rotating disks or platters, a spindle motor, read/write heads, an actuator, a pre-amplifier, a read channel, a write channel, a servocontroller, a memory and control circuitry to control the operation of the HDD and to properly interface the HDD to a host or system bus. The following U.S. Patents describe various aspects of HDD devices:

|           |                                           | Issued   |
|-----------|-------------------------------------------|----------|
| 5,535,067 | Frequency Controlled Reference Generator  | 07/09/96 |
| 5,570,241 | Single Channel, Multiple Head Servo . . . | 10/29/96 |
| 5,862,005 | Synchronous Detection Of Wide BI-Phase . . . | 01/19/99 |
| 5,793,559 | In Drive Correction Of Servo Pattern . . . | 08/11/98 |
| 5,719,719 | Magnetic Disk Drive With Sensing . . .    | 02/17/98 |
| 5,444,583 | Disk Drive Having On-Board Triggered . . . | 08/22/95 |
| 5,448,433 | Disk Drive Information Storage Device . . . | 09/05/95 |
| 5,208,556 | Phase Lock Loop For Sector Servo System   | 05/04/93 |
| 5,642,244 | Method and Apparatus For Switching . . .  | 06/24/97 |

Prior art FIG. 1 illustrates a disk/head assembly 12 and a preamplifier 14. The preamplifier 14 handles both read functions and write functions. Not illustrated in FIG. 1, for clarity, is the Read Write (RW) Head. The unshown RW head works through magnetic media and it contains both functions, read and write, with a different portion of the head performing each function. The write function portion of the MR head is inductive and the read function portion of the head acts as a magnetic resistive (MR) element. A write occurs through an inductive element to the magnetic media disk assembly 12 and a read occurs by sensing the magnetic shifts in the disk assembly 12 by using the resistive read element. As explained below, undesirable magnetic or capacitive coupling often occurs between the writer element in the RW head and the reader element because of their close proximity to each other.

Prior art FIG. 2 depicts a circuit representation the write channel 16 and the read channel 18 of the preamplifier 14 of FIG. 1. The writer 16 is connected to an inductor 20. During a write, the preamplifier 14, through the write channel 18, drives a current 22 through the inductor 20 of the RW head. In close proximity to the inductor 20, is a resistive element 24 on the read channel 18. The value of the resistive element 24 is a function of the magnetic field. Because of the physical closeness of the inductor 20 and the resistive element 24 of the RW head, magnetic or capacitive coupling naturally occurs. This undesirable coupling is represented by the capacitor shown at reference numeral 21. The concern is that this coupling will change the resistive value in the reader portion of the RW head.

In a personal computer during a typical operation, a read and a write to the RW head do not occur at the same time. Only one function at a time is performed; both do not occur simultaneously. In normal read and write operations, a bias current 26 is maintained through the resistive reader element 24 to keep it ready for the read mode. The RW head is very sensitive to current, particularly in the wrong direction. So, typically a bias current 26 is provided to offset any undesirable effects from magnetic coupling.

At the manufacturer, when formatting the disk/head assembly 12, all of the RW heads (1 to 12 at present) are written to at the same time. This is known in the industry as the servo track write mode operation or the servo bank write mode operation. In servo bank write mode, when the disk/head assembly 12 is formatted, all RW heads are written to at the same time to write the servo track wedges on the disks. However, unlike the bias current which is maintained on the read portion of the RW head during a normal write operation, the bias current for all the read channel is not turned on during servo bank write mode as the added power dissipation for having the full RW bias on for all heads may exceed the thermal requirements for the preamplifier.

Prior art FIG. 3 depicts the voltage waveforms of the RW head during servo track mode. The writer voltage is Vw. The reader voltage is Vrmr. If no magnetic coupling existed, when Vw rises, Vrmr would maintain its zero value. However, magnetic (or capacitive) coupling, spikes a voltage on the reader portion of the RW head, which in turn spikes a current. This becomes more of a problem with a new generation of heads because if they have a negative going current, it can greatly upset the magnetic properties of the element and cause it to not read back information from the disk assembly 12 properly. A GMR (Giant Magneto Resistance) RW head is typical of such a newelement having these problems. These heads are extremely sensitive to the negative going currents (voltages). These spikes damage the head, which results in less amplitude output from the head and asymmetric response that yield data bit errors.

It is accordingly an object of this invention to prevent the GMR element in a RW head from becoming upset from its natural state. The negative going current spikes on the reader portion of the head must be eliminated during servo bank write mode when all heads are written to simultaneously.

Other objects and advantages of the invention herein will be apparent to those of ordinary skill in the art having the benefit of the description herein.

SUMMARY OF THE INVENTION

The invention solves the problem of current spikes occurring in the reader portion of a Read Write head of a HDD during servo bank write mode at the HDD manufacturer. During this process when the manufacturer formats the disk assembly, all heads are simultaneously written to. The undesirable current spikes in the read heads are eliminated by providing a relatively small bias current to all read heads during the servo bank write mode. This raises the dc bias level on the reader portion of the RW head to eliminate the negative spikes generated through capacitive or magnetic coupling. The voltage Vrmr appearing on the reader head is prevented from going below zero volts. Thus, the MR element is not upset from its natural state and bit error rates are reduced.

DETAILED DESCRIPTION OF THE PREFERRED EMBODIMENT OF THE INVENTION

Figure 4:
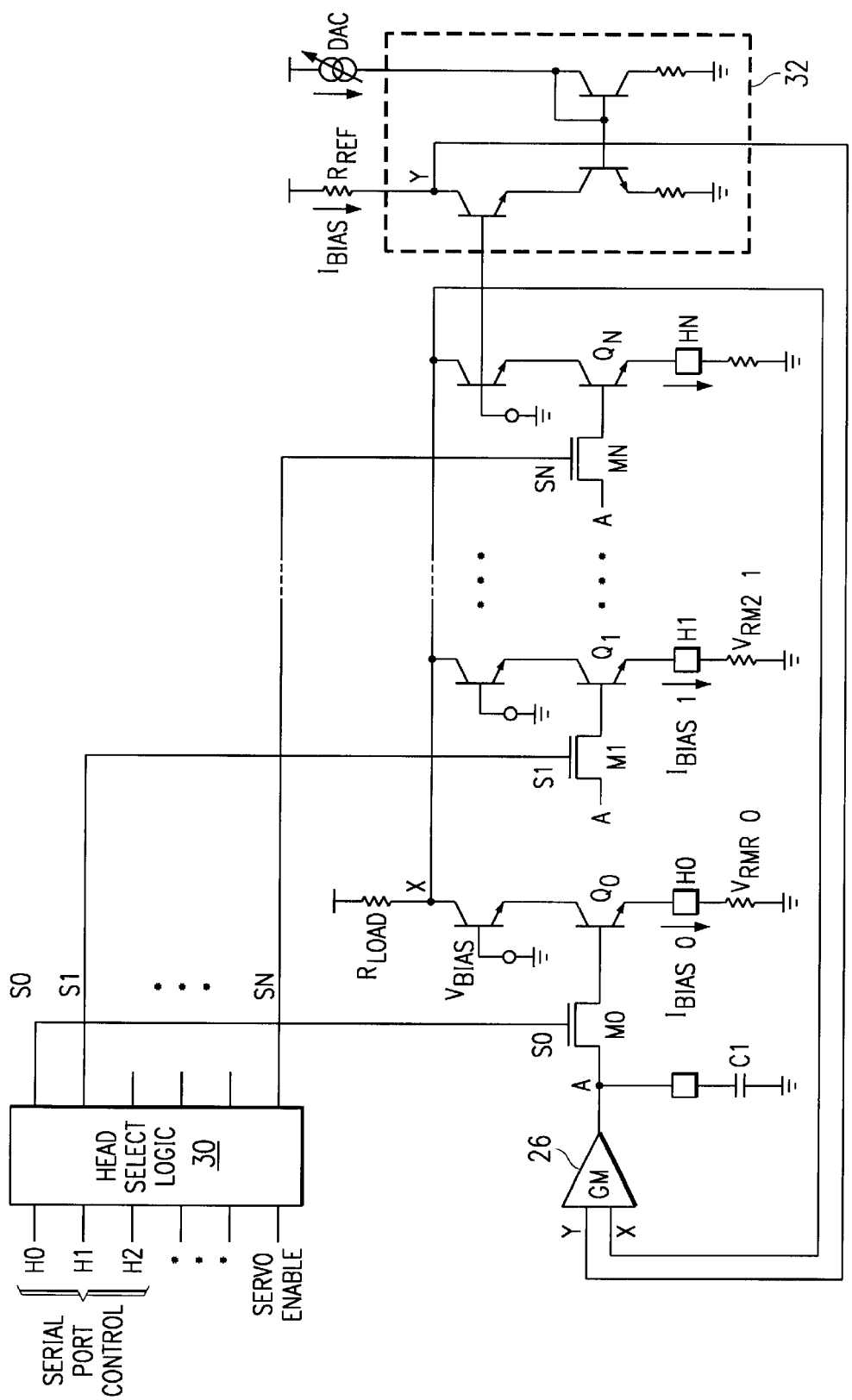
FIG. 4 is a schematic drawing illustrating a preferred embodiment circuit.

Before turning to FIG. 4, which depicts schematically the preferred embodiment of the invention, a simple conceptual explanation of the invention is given.

In typical mass storage devices of the HDD type, the preamplifier may have as many as 1 to 12 channels. When the user of a personal computer writes information to the HDD, typically, only one of the channels at a time is written to. The head selection logic (typically located in the preamplifier) chooses the appropriate head to write to. When writing to the head, to prevent undesirable magnetic coupling, the head selection logic additionally picks the read channel that corresponds to the write channel. By selecting the corresponding read channel, a full amount of bias current is allowed to run through the read portion of the head as the write occurs. This full amount of bias current counteracts the undesirable magnetic or capacitive coupling.

When the HDD is manufactured, the manufacturer formats the disk during an operation known in the industry as "servo bank write". In servo bank write mode, the head selection logic activates and writes to all heads at once. The invention herein adds the servo bank write mode enable signal to the head selection logic circuit. The circuit allows all read heads to be activated during the servo bank write mode. This allows a small amount of bias current (less than the full bias amount) to flow through all read heads when all write heads are active. Thus, the undesirable capacitive or magnetic coupling on the reader heads is virtually eliminated. The invention thus counteracts the undesirable current spikes and the voltage on the reader heads is prevented from going below zero.

Figure 1:
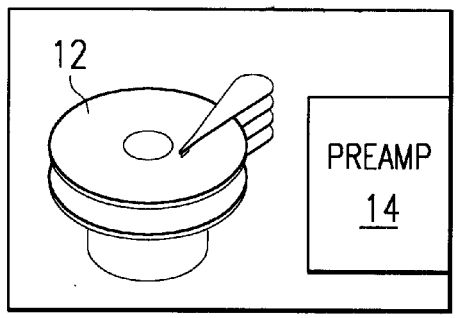
FIG. 1 is a prior art drawing illustrating a disk/head assembly and a preamplifier of a typical HDD device.
Figure 2:
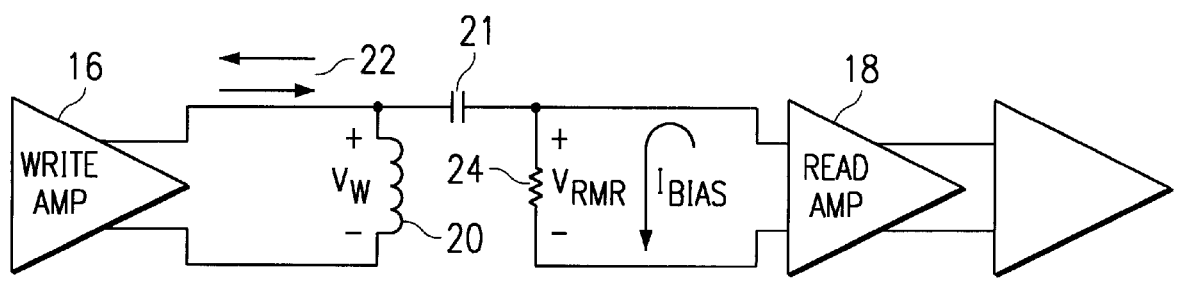
FIG. 2 is a prior art drawing illustrating a portion of the reader channel and a portion of the writer channel of the preamplifier of FIG. 1.

Turning now to FIG. 4, as will be appreciated to those of ordinary skill in the art, a portion of a preamplifier circuit for a HDD application is illustrated. The circuit may be suitably used in preamplifier 14 of FIG. 1. The illustrated preamplifier circuit is of the single ended variety. Its output signals, unillustrated for clarity, would flow into an unillustrated differential amplifier. The circuit illustrates read heads H0 and H1 to HN read heads. As stated above, HDD units manufactured today typically have 1 to 12 read and write channels. The invention is not limited to 1 to 12 channels and will apply as the number of channels increase. A feedback amplifier 26 is a transconductance amplifier. The inputs to the transconductance amplifier 26 are the feedback nodes X and Y. A large capacitor C1 (which may either be either internal or external) sets the low pass frequency of the feed back amplifier 26. The reference side of the feed back amplifier 26 sets up the dc bias. The reference current Ibias is generated by circuit 32 that is essentially a current mirror. The reference current Ibias is converted to a voltage across the reference resistor Rref to set the voltage on the input node Y of the transconductance amplifier 26. The X node voltage is set across the load resistor R1. Through the feedback loop constructed with the GM amplifier 26, the Ibias current is forced through the read portion of the RW element. In a normal read operation, the bias current in a head (Ibias0 represents the bias current in head H0) is equal to Ibias. The amplifier 26 drives a current through the metal-oxide-semiconductor MOS transistor M0 (for head H0) to the base of the input NPN transistor Q0 (for head H0). The size of the MOS transistor is dictated by the thermal noise requirements of the preamplifier.

In FIG. 4, during normal write operation, one of the serial port control signals H0 . . . HN would go to a logic high and the head select logic circuit would appropriately activate the appropriate write head. When the head select logic circuit 30 selects which write head to enable, the head select logic circuit additionally selects the corresponding read head to enable by activating the signal S0 . . . SN that are connected to the gates of the corresponding MOS transistors M0 . . . MN. One channel at a time is selected by controlling the logic on the gate of the metal-oxide-semiconductor transistors M0 and M1. The multiplexing logic within the head select logic circuit 30 makes use of the serial port control signals H0 . . . HN to appropriately activate the corresponding read signals S0 . . . SN. As stated in the Background of Invention, during a write operation, a current is maintained in the corresponding read head. This gives fast write to read switching by allowing monitoring of bias in the reader control loop, in essence, the reader is in standby rather than being shut off. The level of bias current in the read head during a normal write operation is equal in value to Ibias of FIG. 4.

With respect to the invention herein, in FIG. 4, during servo bank write enable, the servo enable signal may be activated either by using an external pin or by using a sequence of bits input into the serial port. During servo bank write mode, the multiplexing logic within head select logic circuit chip 30 incorporates the signal of the servo enable input so that when a servo bank write is to be performed, all outputs of head select logic circuit chip 30 (S0, S1 . . . SN) are enabled. This allows the head select logic circuit 30 to simultaneously select all reader heads by turning on the gates of all MOS transistors (M0 . . . MN). The feedback loop divides the current Ibias by the number of all the enabled heads. This forces the bias current in one branch to be equal to the bias current in the other branch. Thus the current in one branch is equal to Ibias divided N selected reader heads. For example, Ibias0 will equal Ibias1 which will equal IbiasN. Thus, as all read heads are selected, the total sum of the bias currents in the selected read heads will equals Ibias. A small amount of bias current to each read head effectively prevents disruption through any magnetic or capacitive coupling during servo bank write mode.

Figure 3:
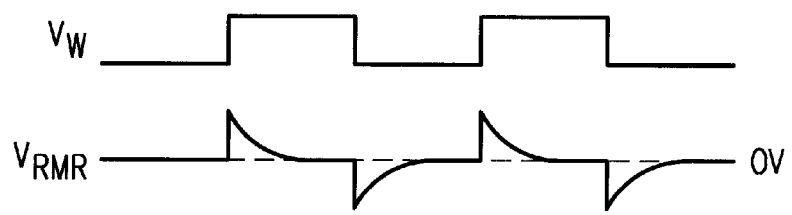
FIG. 3 is a prior art drawing illustrating the voltage waveforms occurring during a write on the writer element and the reader element of a RW head.

By utilizing the multiplexing logic for the head select and combining it with the enable signal used for servo bank write enable, all reader heads may be activated simultaneously to provide a small amount of bias current to each head. This counteracts any adverse magnetic or capacitive coupling arising from simultaneous activation of all writer heads during servo bank write mode. The small amount of bias current in each head during servo bank write (as opposed to a full amount of bias current as during a normal write) avoids added power dissipation and thus stays within the thermal requirements for the preamplifier. The undesirable current spikes are eliminated. Compared to prior art FIG. 3, the negative going Vrmr is prevented from going below zero volts. Overall drive yield of the preamplifier is improved by preventing damage to the MR and GMR portions of the RW heads.

Of course, the invention may be modified so that not all read heads need be selected. All even heads could be selected, all odd heads could be selected or any other combination.

While the invention has been particularly shown and described by the foregoing detailed description, it will be understood by those skilled in the art that various other changes in form and detail may be made without departing from the spirit and scope of the invention as defined by the following claims.

What is claimed is:

1. A method of preventing coupling in a magnetoresistive head of a disk drive during a servo block write operation, comprising the steps of:

initiating the servo block write operation by selecting all write heads;

selecting all read heads; and providing a bias current in all read heads during the servo block write operation using a circuit having a head select logic circuit, a plurality of MOSFET transistors, a plurality of sub-circuit portions, a feedback amplifier, and a bias current source, wherein the head select logic circuit includes a plurality of inputs and a plurality of outputs, the plurality of inputs coupled to each respective read head, the plurality of outputs coupled to each respective one of the plurality of MOSFET transistors, the plurality of sub-circuit portions coupled between the respective one of the plurality of MOSFET transistors and the bias current source, the plurality of sub-circuit portions coupled to each respective read head, the feedback amplifier coupled between the current source and the respective one of the plurality of MOSFET transistors.

2. The method of claim 1 wherein the step of selecting all read heads occurs by the steps of:

coupling a servo enable signal to a logic circuit which selects which write heads and which read heads to enable; and activating all read heads when the servo enable signal is activated.

3. The method of claim 1 wherein the step of providing a bias current in all read heads during the servo block write operation provides approximately the same amount of bias current in each read head.

4. A circuit to produce a bias current in each of a plurality of read heads of a hard disk drive assembly during a servo block write operation, having a power supply rail, comprising:

a reference resistor coupled to the power supply rail to provide a reference voltage;

a current mirror coupled to the reference resistor to produce a bias current;

a load resistor coupled to the power supply rail;

a plurality of sub-circuit portions, having a first and second bipolar transistor, each of the plurality of sub-circuit portions coupled to a corresponding one of the plurality of read heads, each bipolar transistor having a base, a collector and an emitter, the collector of each of the plurality of first bipolar transistors coupled to the load resistor, the base of each of the plurality of first bipolar transistors coupled to ground, the emitter of each of the plurality of first bipolar transistors coupled to the collector of each corresponding second bipolar transistor, the emitter of each of the plurality of second bipolar transistors coupled to a corresponding one of the plurality of read heads;

a head select logic circuit, having a servo block write enable input, a plurality of inputs, and a corresponding plurality of outputs, each of the plurality of inputs coupled to a corresponding one of the plurality of read heads;

a plurality of MOSFET transistors, each having a gate, a drain and a source, the gate of each of the plurality of MOSFET transistors coupled to the corresponding one of the plurality of outputs of the head select logic circuit, the source of each of the plurality of MOSFET transistors coupled to a corresponding base of the plurality of the second bipolar transistors; and a feedback amplifier having a first input, a second input and an output, the first input coupled to the load resistor, the second input coupled to the reference voltage, the output coupled to the drain of each of the plurality of MOSFET transistors;

wherein the head select logic circuit couples to receive a servo block write enable signal at the servo block write enable input, wherein the head select logic circuit enables each of the plurality of MOSFET transistors corresponding to each of the plurality of read heads in response to an active servo block write enable signal to allow a small amount of the bias current to flow through each of the plurality of read heads.

5. The circuit as recited in claim 4, further comprising:

a capacitor coupled to the output of the feedback amplifier to set the low pass frequency of the feedback amplifier.

* * * * *